United States Patent
Aoki et al.

(10) Patent No.: US 10,280,251 B2
(45) Date of Patent: May 7, 2019

(54) EPOXY RESIN COMPOSITION, PREPREG, AND CARBON FIBER-REINFORCED COMPOSITE MATERIAL

(71) Applicant: TORAY INDUSTRIES, INC., Tokyo (JP)

(72) Inventors: Junichi Aoki, Ehime (JP); Atsuhito Arai, Ehime (JP); Hiroaki Sakata, Ehime (JP); Takashi Ochi, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/558,087

(22) PCT Filed: Mar. 16, 2016

(86) PCT No.: PCT/JP2016/058271
§ 371 (c)(1),
(2) Date: Sep. 13, 2017

(87) PCT Pub. No.: WO2016/148175
PCT Pub. Date: Sep. 22, 2016

(65) Prior Publication Data
US 2018/0051125 A1 Feb. 22, 2018

(30) Foreign Application Priority Data
Mar. 17, 2015 (JP) .................. 2015-053132

(51) Int. Cl.
| | | |
|---|---|---|
| *C08J 5/24* | (2006.01) | |
| *C08K 3/04* | (2006.01) | |
| *C08G 59/20* | (2006.01) | |
| *C08G 59/24* | (2006.01) | |
| *C08G 59/32* | (2006.01) | |
| *C08G 59/38* | (2006.01) | |
| *C08G 59/50* | (2006.01) | |
| *C08G 73/02* | (2006.01) | |
| *C08G 73/10* | (2006.01) | |
| *C08G 75/23* | (2006.01) | |
| *C08L 63/00* | (2006.01) | |

(Continued)

(52) U.S. Cl.
CPC ........... *C08G 59/245* (2013.01); *C08G 59/20* (2013.01); *C08G 59/3227* (2013.01); *C08G 59/38* (2013.01); *C08G 59/5033* (2013.01); *C08G 73/026* (2013.01); *C08G 73/1071* (2013.01); *C08G 75/23* (2013.01); *C08J 5/24* (2013.01); *C08K 3/046* (2017.05); *C08L 63/00* (2013.01); *C08L 2205/035* (2013.01)

(58) Field of Classification Search
None
See application file for complete search history.

(56) References Cited

U.S. PATENT DOCUMENTS

| 5,331,068 A | 7/1994 | Blyakhman |
| 8,951,398 B2 | 2/2015 | Nishiguchi et al. |

(Continued)

FOREIGN PATENT DOCUMENTS

| JP | 01104624 A | 4/1989 |
| JP | 05214075 A | 8/1993 |
| JP | 06145293 A | 5/1994 |
| JP | 10202814 A | 8/1998 |
| JP | 11217422 A | 8/1999 |
| JP | 2000086742 A | 3/2000 |
| JP | 2001031783 A | 2/2001 |
| JP | 2002363253 A | 12/2002 |

(Continued)

OTHER PUBLICATIONS

International Search Report and Written Opinion for International Application No. PCT/JP2016/058271, dated May 17, 2016—5 Pages.

*Primary Examiner* — Ana L. Woodward
(74) *Attorney, Agent, or Firm* — RatnerPrestia

(57) ABSTRACT

Provided is an epoxy resin composition for giving a carbon fiber-reinforced composite material that simultaneously achieves tensile strength and compressive strength. An epoxy resin composition containing at least the following constituent elements [A]-[D] wherein the epoxy resin composition contains 5-50 mass % of constituent element [A] and 20-95 mass % of constituent element [B] relative to 100 mass % of total epoxy resin weight. [A]: at least one epoxy resin selected from 1,2-bis(glycidyloxy)benzene, 1,3-bis (glycidyloxy)benzene, 1,4-bis(glycidyloxy)benzene, derivatives of these, and epoxy resins having a structure represented by general formula [1] (in general formula [1], at least one of $R_1$-$R_5$ and at least one of $R_6$-$R_{10}$ is a glycidyl ether group, and the other $R_1$-$R_{10}$ represent any of a hydrogen atom, halogen atom, or aliphatic hydrocarbon group having four or fewer carbon atoms.); [B]: glycidylamine epoxy resin having three or more glycidyl groups per molecule; [C]: thermoplastic resin soluble in epoxy resin; [D]: epoxy resin curing agent.

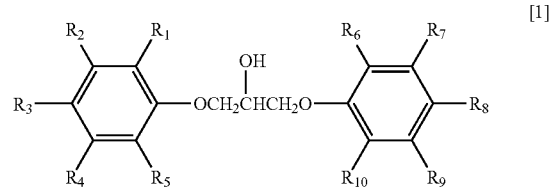

[1]

10 Claims, No Drawings

(51) Int. Cl.
*C08L 79/08* (2006.01)
*C08L 81/06* (2006.01)

(56) References Cited

U.S. PATENT DOCUMENTS

| | | | |
|---|---|---|---|
| 9,695,334 B2 | 7/2017 | Golden et al. | |
| 2013/0005855 A1* | 1/2013 | Arai | C08G 59/3227 523/427 |
| 2013/0330478 A1 | 12/2013 | Ushiyama | |

FOREIGN PATENT DOCUMENTS

| | | |
|---|---|---|
| JP | 2004269861 A | 9/2004 |
| JP | 2005298713 A | 10/2005 |
| JP | 2011162619 A | 8/2011 |
| JP | 2013049781 A | 3/2013 |
| JP | 5763065 B2 | 8/2015 |
| JP | 5814828 B2 | 11/2015 |
| WO | 2012111764 A1 | 7/2014 |

* cited by examiner

EPOXY RESIN COMPOSITION, PREPREG, AND CARBON FIBER-REINFORCED COMPOSITE MATERIAL

CROSS REFERENCE TO RELATED APPLICATIONS

This is the U.S. National Phase application, of PCT/JP2016/058271, filed Mar. 16, 2016, which claims priority to Japanese Patent Application No. 2015-053132, filed Mar. 17, 2015, the disclosures of these applications being incorporated herein by reference in their entireties for all purposes.

TECHNICAL FIELD OF THE INVENTION

The present invention relates to a carbon fiber reinforced composite material and an epoxy resin composition suitably used therefor. More specifically, it relates to an epoxy resin composition that serves to form a carbon fiber reinforced composite material having good mechanical properties including tensile strength and compression strength.

BACKGROUND OF THE INVENTION

High in specific strength and specific modulus, carbon fiber reinforced composite materials (hereinafter occasionally referred to simply as composite materials) in recent years have come into wider use in various fields including aircraft, automobiles, sports tools, fishing tools, blades for wind power generation, and personal computer housing. These structures often have complicated shapes and many of them are produced by laminating layers of carbon fiber reinforced fiber woven fabric prepreg that is in the form of thin, flexible sheets with isotropic material properties.

These prepreg sheets are generally produced from thermosetting resin compositions, epoxy resin compositions among others, that have good mechanical properties, high heat resistance, and high process-related handleability. In the field of manufacturing of structural members of aircraft and automobiles, there are increased needs in recent years for materials with improved mechanical properties that enable weight reduction and enhancement in major characteristics including tensile strength and compression strength has been strongly called for. In increasing the tensile strength of composite materials produced from epoxy resin compositions, not only an improvement in the tensile strength of the carbon fibers used as the base material, but also a reduction in the crosslink density in the cured products of the epoxy resin compositions (hereinafter referred to simply as cured products) is effective. However, a reduction in crosslink density leads to the problem of poor heat resistance of the cured product. On the other hand, a cured product with a high elastic modulus can work effectively in producing a composite material with an improved compression strength. However, a high crosslink density is an effective factor in producing a cured product with an improved elastic modulus. Thus, it has been a very difficult issue to produce a composite material that is high in both tensile strength and compression strength.

As a prior art technique, Patent document 1, for example, proposes the use of diaminodiphenyl sulfone, 3,3'-diaminodiphenyl sulfone in particular, as a curing agent for epoxy resins, is effective for producing a cured product with an improved elastic modulus, but there are no descriptions about providing a composite material with an improve strength. Patent document 2 describes that the use of 3,3'-diaminodiphenyl sulfone and 3,4'-diaminodiphenyl sulfone serves to producing a cured product with an improved elastic modulus, which enables the production of a composite material with an improved compression strength, but there are no descriptions about improving the tensile strength of composite materials. To produce a composite material with an improved tensile strength, decreasing the number of functional epoxy groups is effective because it works to reduce the crosslink density. To provide a composite material with an improved compression strength, on the other hand, increasing the number of functional epoxy groups is effective because it works to raise the crosslink density. Furthermore, the introduction of molecules having a structure that is bent or a structure that enables easy interaction of molecular chains is considered to be effective for producing a cured product with an improved elastic modulus. For example, disclosed examples include a resin composition containing a t-butyl catechol type epoxy resin (Patent document 3). Its molecule has a structure in which the number of epoxy groups is smaller to enable easy interaction of molecular chains and contains hydroxyl groups that are expected to help form hydrogen bonds. Patent document 4 discloses an epoxy resin having a t-butyl hydroquinone structure and Patent document 5 discloses an epoxy resin composition having a resorcinol structure. Patent documents 3 to 5, however, fail to provide a composite material having a required strength and heat resistance. Patent document 6 proposes a composition containing a t-butyl catechol type epoxy resin to be used as a component for painting material. However, required mechanical properties were not achieved when simply using it as a resin composition to produce a composite material.

PATENT DOCUMENTS

Patent document 1: Japanese Unexamined Patent Publication (Kokai) No. HEI 5-214075
Patent document 2: Japanese Unexamined Patent Publication (Kokai) No. 2002-363253
Patent document 3: Japanese Unexamined Patent Publication (Kokai) No. HEI 11-217422
Patent document 4: Japanese Unexamined Patent Publication (Kokai) No. HEI 6-145293
Patent document 5: Japanese Patent No. 5763065
Patent document 6: Japanese Patent No. 5814828

SUMMARY OF THE INVENTION

Thus, an object of the present invention is to provide an epoxy resin composition serving to produce a carbon fiber reinforced composite material that is high in both tensile strength and compression strength.

As a result of intensive studies on the above problems, the present inventors have arrived at the present invention based on the findings that the problems can be solved by using a combination of a plurality of specific epoxy resin components mixed in a specific range.

Specifically, the epoxy resin composition according to the present invention includes at least the undermentioned components [A] to [D], component [A] accounting for 5 to 50 mass % and component [B] accounting for 20 to 95 mass % relative to the total quantity, which accounts for 100 mass %, of the epoxy resins:

[A]: at least one epoxy resin selected from the group consisting of 1,2-bis(glycidyloxy) benzene, 1,3-bis(glycidyloxy) benzene, 1,4-bis(glycidyloxy) benzene, derivatives thereof, and epoxy resins each having a structure as represented by general formula [1].

[Chemical compound 1]

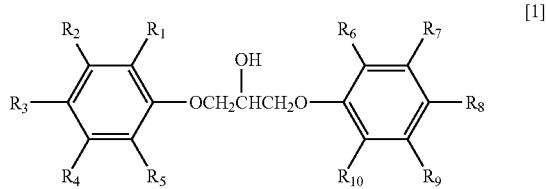

(Here, at least one of $R_1$ to $R_5$ and at least one of $R_6$ to $R_{10}$ in general formula [1] are each a glycidyl ether group and the rest of $R_1$ to $R_{10}$ are each a hydrogen atom, a halogen atom, or an aliphatic hydrocarbon group having 4 or less carbon atoms.)

[B]: a glycidyl amine type epoxy resin having three or more glycidyl groups per molecule,

[C] a thermoplastic resin soluble in epoxy resins, and

[D] an epoxy resin curing agent.

The prepreg according to the present invention is produced by impregnating carbon fiber with the above epoxy resin composition.

The carbon fiber reinforced composite material according to the present invention includes the aforementioned epoxy resin composition and carbon fiber.

The present invention can provide an epoxy resin composition that serves to produce a carbon fiber reinforced composite material that is high in tensile strength and compression strength.

DETAILED DESCRIPTION OF THE INVENTION

The epoxy resin composition according to the present invention is described in more detail below. Specifically, the epoxy resin composition according to the present invention includes at least the undermentioned components [A] to [D], component [A] accounting for 5 to 50 mass % and component [B] accounting for 20 to 95 mass % relative to the total quantity, which accounts for 100 mass %, of the epoxy resins:

[A]: at least one epoxy resin selected from the group consisting of 1,2-bis(glycidyloxy) benzene, 1,3-bis(glycidyloxy) benzene, 1,4-bis(glycidyloxy) benzene, derivatives thereof, and epoxy resins each having a structure as represented by general formula [1] given above,

[B]: a glycidyl amine type epoxy resin having three or more glycidyl groups per molecule,

[C] a thermoplastic resin soluble in epoxy resins, and

[D] an epoxy resin curing agent.

The epoxy resin component [A] used for the present invention is at least one epoxy resin having a benzene ring with two or more glycidyl ether groups bonded thereto and selected from the group consisting of 1,2-bis(glycidyloxy) benzene, 1,3-bis(glycidyloxy) benzene, 1,4-bis(glycidyloxy) benzene, derivatives thereof, and epoxy resins each having a structure as represented by general formula [1] given above. Here, 1,2-bis(glycidyloxy) benzene is a catechol type one having two glycidyl ether groups at ortho positions; 1,3-bis(glycidyloxy) benzene is a resorcinol type one having two glycidyl ether groups at meta positions; and 1,4-bis(glycidyloxy) benzene is a hydroquinone type one having two glycidyl ether groups at para positions. To produce a cured product with an improved elastic modulus by allowing the bent molecular structure to serve to fill the free volume formed among molecular chains, it is preferable to use a catechol type or a resorcinol type molecule, more preferably a catechol type one, which has a higher degree of bending. From the viewpoint of filling the free volume, a molecule having a bulky substituent group can work effectively, and it is preferable to introduce, for example, a tertiary butyl (t-butyl) group as such a substituent group.

The epoxy resin as represented by general formula [1] given above is 1,2-bis(glycidyloxy) benzene, 1,3-bis(glycidyloxy) benzene, 1,4-bis(glycidyloxy) benzene, or a derivative thereof in the form of a dimmer, each having a benzene ring with two or more glycidyl ether groups bonded thereto. At least one of $R_1$ to $R_5$ and at least one of $R_6$ to $R_{10}$ are each a glycidyl ether group and the rest of $R_1$ to $R_{10}$ are each a hydrogen atom, a halogen atom, or an aliphatic hydrocarbon group having 4 or less carbon atoms. Specific examples of isomers include catechol type molecules in which glycidyl ether groups are contained as $R_1$ and $R_6$ which are located at ortho positions relative to the oxygen atoms at the ends of the aliphatic chain connecting the two units, resorcinol type molecules in which glycidyl ether groups are contained as $R_2$ and $R_7$ which are located at meta positions, and hydroquinone type molecules in which glycidyl ether groups are contained as $R_3$ and $R_8$ which are located at the para positions. Of the various dimmers, catechol type and resorcinol type ones are preferable and catechol type ones are more preferable from the viewpoint of the elastic modulus improving effect of free volume reduction in the cured product brought about by bent molecular chains. The use of a dimmer is preferable because the chain connecting the units contains a hydroxyl group, which causes strong interaction among molecular chains and serves to form a cured product with an improved elastic modulus. In the aromatic rings in each unit, the substituent groups $R_1$ to $R_{10}$ may each be a halogen atom, hydrogen atom, or an aliphatic hydrocarbon group, but in the case of an aliphatic hydrocarbon group, the number of carbon atoms contained is preferably 4 or less in order to maintain compatibility with the other components and realize good mechanical properties.

The epoxy resin [A] can be prepared by, for example, a production procedure as described below. First, epichlorohydrin and isopropyl alcohol is dissolved in a dihydroxy benzene, and after heating, an aqueous solution of sodium hydroxide is added dropwise. Then, the saline solution is separated and removed, and the excess epichlorohydrin, isopropyl alcohol, and water are distilled and recovered, leaving a crude resin. This is then dissolved in toluene and a basic aqueous solution is added, followed by heating while stirring. Subsequently, rinsing is performed to obtain a salt, and the alkali component is removed by an oil separation technique, followed by dehydration, filtering, and toluene distillation to provide the intended product.

Commercial products of the epoxy resin [A] include Epicron (registered trademark) HP-820 (manufactured by DIC Corporation), Denacol (registered trademark) Ex-201, Denacol (registered trademark) Ex-203 (both manufactured by Nagase ChemteX Corporation), and YDC-1312 (manufactured by Nippon Steel & Sumikin Chemical Co., Ltd.).

The addition of the epoxy resin [A] to 5 to 50 mass %, preferably 5 to 40 mass %, relative to the total quantity of the epoxy resins serves to realize good mechanical properties and a high glass transition temperature (hereinafter occasionally abbreviated as Tg). Here, the quantity of the epoxy resin [A] means the total quantity of 1,2-bis(glycidyloxy) benzene, 1,3-bis(glycidyloxy) benzene, 1,4-bis(glycidyloxy) benzene, derivatives thereof, and epoxy resins each having a structure as represented by general formula [1] given above.

The epoxy resin [B] used for the present invention is a glycidyl amine type epoxy resin having three or more glycidyl groups per molecule. It is preferable for each molecule to contain three or four glycidyl group because the resulting composite material will have mechanical properties and heat resistance in a good balance. Preferable examples of component [B] include compounds produced by glycidylating a precursor such as diaminodiphenyl methane, diaminodiphenyl sulfone, diaminodiphenyl ether, xylene diamine, aminophenol, a constitutional isomer thereof, a derivative having a halogen atom or an alkyl substituent group having 3 or less carbon atoms. More specifically, they include tetraglycidyl diaminodiphenyl methane, glycidyl compounds of xylene diamine, triglycidyl aminophenol, tetraglycidyl diaminodiphenyl sulfone, and tetraglycidyl diaminodiphenyl ether.

Commercial products of the epoxy resin [B] include the following.

Usable commercial products of tetraglycidyl diaminodiphenyl methane include Sumiepoxy (registered trademark) ELM434 (manufactured by Sumitomo Chemical Co., Ltd.), Araldite (registered trademark) MY720, Araldite (registered trademark) MY721, Araldite (registered trademark) MY9512, Araldite (registered trademark) MY9612, Araldite (registered trademark) MY9634, and Araldite (registered trademark) MY9663 (all manufactured by Huntsman Advanced Materials Gmbh).

Commercial products of glycidyl compounds of xylene diamine include TETRAD-X (Mitsubishi Gas Chemical Company, Inc.).

Commercial products of triglycidyl aminophenol include Araldite (registered trademark) MY0500, Araldite (registered trademark) MY0510 (both manufactured by Huntsman Advanced Materials Gmbh), and jER (registered trademark) 630 (manufactured by Mitsubishi Chemical Corporation), which are produced from p-aminophenol as precursor, and Araldite (registered trademark) MY0600 and Araldite (registered trademark) MY0610 (both manufactured by Huntsman Advanced Materials Gmbh), which are produced from m-aminophenol as precursor.

To ensure a high-level balance among various mechanical properties, the epoxy resin [B] accounts for 20 to 95 mass %, preferably 40 to 90 mass %, relative to the total quantity of the epoxy resins.

From the viewpoint of ensuring a high heat resistance, the thermoplastic resin [C] used for the present invention, which is a thermoplastic resin soluble in epoxy resins, preferably has a Tg of 200° C. or more and preferably has an aromatic ring in its molecule. Specifically, preferable examples include polyethersulfone, polyether ether sulfone, polyether imide, polyphenylene oxide, and polysulfone. From the viewpoint of uniform solubility in the curing step, the use of polyethersulfone, polyetherimide, or polysulfone is more preferable.

Commercial products of the thermoplastic resin [C] include Sumikaexcel (registered trademark) PES5003P (manufactured by Sumitomo Chemical Co., Ltd.) and Virantage (registered trademark) VW10700 (manufactured by Solvay Advanced Polymers), which are polyether sulfone with hydroxyl groups at the chain ends, Sumikaexcel (registered trademark) PES7600P (manufactured by Sumitomo Chemical Co., Ltd.), which is polyether sulfone with chlorinated chain ends, ULTEM (registered trademark) 1010 (manufactured by Sabic Innovative Plastics), which is polyether imide with anhydrides or amino groups at the chain ends, and Virantage (registered trademark) VW30500 (manufactured by Solvay Advanced Polymers), which is polysulfone.

The thermoplastic resin [C] preferably accounts for 1 to 20 parts by mass relative to the total quantity, which accounts for 100 mass %, of the epoxy resin composition. If staying in this range, it will be high in handleability in terms of tackiness and drape property and give an epoxy resin composition whose viscosity can be adjusted in an appropriate range.

The epoxy resin composition preferably has a viscosity of 0.01 to 200 Pa·s at 80° C. because impregnation of a fiber base can be performed favorably with reduced void formation during the step for producing prepreg sheets for composite material. The viscosity of epoxy resin compositions was measured by a dynamic viscoelasticity measuring machine (ARES-G2, manufactured by TA Instruments). A specimen of an epoxy resin composition was set between parallel flat plates with a diameter of 40 mm in such a manner that the distance between the upper and lower plates was 1 mm, and measurements were taken in the twist mode (angular frequency 3.14 rad/s) after confirming that an appropriate measuring temperature had been reached.

There are no specific limitations on the epoxy resin curing agent [D] used for the present invention as long as it has an active group that can react with the epoxy resin. Examples of such an active group that can react with the epoxy resin include amino groups and acid anhydride groups. The epoxy resin composition to be used is preferably as high in storage stability as possible, but since liquid curing agents are high in reactivity, it is preferably in a solid state at room temperature.

The epoxy resin curing agent [D] is preferably an aromatic amine and preferably has one to four phenyl groups in its molecule from the viewpoint of heat resistance and mechanical properties. Furthermore, since a bent molecule backbone can contribute to an increase in the resin's elastic modulus and improvement in mechanical properties, the epoxy resin curing agent is preferably an aromatic polyamine compound in which the at least one phenyl group contained in the backbone has amino groups at ortho or meta positions. Specific examples of such aromatic polyamine compounds include meta-phenylene diamine, diaminodiphenyl methane, diaminodiphenyl sulfone, meta-xylylene diamine, diphenyl-p-dianiline, various derivatives thereof such as alkyl-substituted compounds thereof, and various isomers containing amino groups at different positions. These curing agents may be used singly or as a mixture of two or more thereof. In particular, diaminodiphenyl methane and diaminodiphenyl sulfone are desirable in order to produce a composition with a higher heat resistance.

Commercial products of such aromatic polyamine curing agents include Seikacure S (manufactured by Wakayama Seika Kogyo Co., Ltd.), MDA-220 (manufactured by Mitsui Chemicals, Inc.), jER Cure (registered trademark) (manufactured by Mitsubishi Chemical Corporation), 3,3'-DAS (manufactured by Mitsui Fine Chemicals, Inc.), Lonzacure (registered trademark) M-DEA (manufactured by Lonza), Lonzacure (registered trademark) M-DIPA (manufactured by Lonza), Lonzacure (registered trademark) M-MIPA (manufactured by Lonza), and Lonzacure (registered trademark) DETDA 80 (manufactured by Lonza).

The optimum content of the epoxy resin curing agent [D] depends on the epoxy resin to be combined. The ratio of the quantity of active hydrogen in the epoxy resin curing agent [D] to that of epoxy groups in the epoxy resin should be adjusted preferably 0.5 to 1.4, more preferably 0.6 to 1.4, to allow the curing to proceed to a sufficiently high degree and to reduce the adverse influence of an excess of the curing agent to the mechanical properties.

For the present invention, a bifunctional epoxy resin, which is referred to as component [E], may be adopted in addition to components [A] to [D]. The addition of component [E] serves to further improve the mechanical properties and heat resistance. There are no specific limitations on component [E] as long as it is a bifunctional epoxy resin and preferable examples thereof include bisphenol type epoxy resin, epoxy resin with a biphenyl backbone, epoxy resin with a naphthalene backbone, epoxy resin with a binaphthalene backbone, and novolac type epoxy resin. If component [E] is adopted, blending should be performed in such a manner that the total of component [A], component [B], and component [E], which are all epoxy resins, accounts for 100 mass %.

Commercial products of bisphenol A type epoxy resin component [E] include jER (registered trademark) 825, jER (registered trademark) 826, jER (registered trademark) 827, jER (registered trademark) 828, jER (registered trademark) 834, jER (registered trademark) 1001, jER (registered trademark) 1002, jER (registered trademark) 1003, jER (registered trademark) 1004, jER (registered trademark) 1004 AF, jER (registered trademark) 1007, jER (registered trademark) 1009 (all manufactured by Mitsubishi Chemical Corporation), Epicron (registered trademark) 850 (manufactured by DIC Corporation), Epotohto (registered trademark) YD-128 (manufactured by Nippon Steel & Sumikin Chemical Co., Ltd.), DER-331, and DER-332 (both manufactured by The Dow Chemical Company). Commercial products of bisphenol F type epoxy resin include jER (registered trademark) 806, jER (registered trademark) 807, jER (registered trademark) 1750, jER (registered trademark) 4002, jER (registered trademark) 4004P, jER (registered trademark) 4007P, jER (registered trademark) 4009P (all manufactured by Mitsubishi Chemical Corporation), Epicron (registered trademark) 830 (manufactured by DIC Corporation), Epotohto (registered trademark) YD-170, Epotohto (registered trademark) YD-175, Epotohto (registered trademark) YDF2001, and Epotohto (registered trademark) YDF2004 (all manufactured by Nippon Steel & Sumikin Chemical Co., Ltd.).

The epoxy resin [E] preferably accounts for 0.5 to 40 mass % relative to the total quantity of the epoxy resins because it will serve to obtain a composite material having good mechanical properties.

There are no specific limitations on the method to be used for its preparation as long as it is generally used for preparing epoxy resins, but a preferred method is to apply a shear force to liquid resin with the aim of dissolving and dispersing solid components in the liquid component. Specific examples of preferred devices include kneader, planetary mixer, triple roll mill, rotation and revolution type mixer. When dissolving component [C] in component [A], component [B], or a mixture thereof, kneading them while applying a shear force in such a device at a temperature of 70° C. to 200° C. is preferable because component [C], once dissolved, will be diffused uniformly to prevent an uneven viscosity distribution from being caused in the resulting epoxy resin composition. Such dissolution is assumed to be complete when it is confirmed that lumps of component [C] are no longer found visually.

The epoxy resin composition according to the present invention may contain particles formed mainly of a thermoplastic resin. Such particles formed mainly of a thermoplastic resin may be added with the aim of ensuring impact resistance in the fiber reinforced composite material produced according to the present invention. In general, a fiber reinforced composite material has a lamination structure, and if an impact is applied to it, a high stress occurs between the layers to cause delamination damage. Therefore, when it is desired to enhance the impact resistance against impacts from outside, it is only required to increase the toughness of the resin layers (hereinafter, occasionally referred to as interlaminar resin layers) formed between the reinforcement fiber layers in the fiber reinforced composite material. For the present invention, the addition of component [C] is intended for further selective enhancement of the toughness of the interlaminar resin layers in the fiber reinforced composite material to be produced according to the present invention. The thermoplastic resin used as the primary component of the above particles may be identical to or different from the thermoplastic resin used as component [C].

Preferable examples of the thermoplastic resin used as component of the particles include polyamide, polyimide, and the like, of which polyamide is the most preferable because it is so high in toughness as to serve for large improvement in impact resistance. Preferable examples of such polyamide include polyamide 12, polyamide 11, polyamide 6, polyamide 66, polyamide 6/12 copolymer, and polyamide polymers partially modified with an epoxy compound into an IPN (interpenetrating polymer network) structure (semi-IPN polyamide) as described in Example 1 of Japanese Unexamined Patent Publication (Kokai) No. HEI 01-104624. In regard to the shape of the thermoplastic resin particles, they may be spherical particles, non-spherical particles, or porous particles, of which spherical particles are preferable because they ensure high fluidity by preventing deterioration in the flow characteristics of the resin and also ensure high impact resistance by eliminating potential starting points of stress concentrations.

Useful commercial products of polyamide particles include SP-500, SP-10, TR-1, TR-2, 842P-48, and 842P-80 (all manufactured by Toray Industries, Inc.), Orgasol (registered trademark) 1002D, 2001UD, 2001EXD, 2002D, 3202D, 3501D, and 3502D (all manufactured by Arkema K.K.), Grilamide (registered trademark) TR90 and TR55 (both manufactured by EMS-Chemie), TROGAMID (registered trademark) CX7323, CX9701, and CX9704 (all manufactured by Degussa AG). These polyamide particle materials may be used singly, or a plurality thereof may be used in combination.

To realize selective toughness enhancement of interlaminar resin layers in the fiber reinforced composite material produced according to the present invention, it is desirable for the particles formed mainly of thermoplastic resin to be maintained in the interlaminar resin layers. Preferred techniques for maintaining particles in interlaminar resin layers include forming a prepreg stack formed from fibers carrying particles on the surface thereof or an epoxy resin composition containing particles. The particles formed mainly of thermoplastic resin preferably have a number average particle diameter in the range of 5 to 50 µm, more preferably in the range of 7 to 40 µm, and still more preferably in the range of 10 to 30 µm. A number average particle diameter controlled at 5 µm or more serves to prevent the particles from getting into the bundles of reinforcement fibers and allow them to stay on the carbon fiber surface or in the epoxy resin composition in the fiber reinforced composite material, whereas a number average particle diameter controlled at 50 µm or less serves to form a matrix resin layer with an appropriate thickness on the prepreg surface and, in addition, ensure an appropriate fiber mass content in the fiber reinforced composite material.

The epoxy resin composition according to the present invention may be combined with carbon fibers for use as a composite material. Any known type of carbon fibers may be adopted, but the carbon fibers to be used preferably show a strand strength of 3,000 MPa or more and 7,500 MPa or less in strand tensile test and have an elastic modulus of 200 GPa or more and 450 GPa or less. Here, the strand tensile test is performed according to JIS R 7601 (1986) using a specimen prepared by impregnating bundles of carbon fibers with a matrix resin composed of the undermentioned components and curing it for 35 minutes at a temperature of 130° C.

3',4'-epoxycyclohexylmethyl-3,4-epoxycyclohexane carboxylate (for example, Celoxide manufactured by Daicel Chemical Industries, Ltd.): 100 parts by mass boron trifluoride monoethyl amine (for example, product manufactured by Stella Chemifa Corporation): 3 parts by mass acetone (for example, product manufactured by Wako Pure Chemical Industries, Ltd.): 4 parts by mass The number of filaments in the carbon fiber is preferably 1,000 to 100,000, more preferably 3,000 to 50,000. Complicated operations will be required for prepreg production if the number of carbon fiber filaments is less than 1,000, whereas it will be difficult to impregnate resin among the filaments, possibly leading to poor impregnation, if the number of carbon fiber filaments is more than 100,000.

The carbon fibers are preferably in the form of continuous fibers with a length of 10 mm or more paralleled in one direction or woven fabrics of plain weave, sateen weave, or twill weave, and the layers are preferably formed of such carbon fibers.

When the epoxy resin composition according to the present invention is used for producing a composite material, a fiber base may be impregnated with a resin to form an A-stage or B-stage prepreg to be molded by a method as described later.

The prepreg according to the present invention is in the form of a base material of carbon fibers, such as a sheet of continuous carbon fibers paralleled in one direction and carbon fiber woven fabric, impregnated with an epoxy resin composition, a carbon fiber base with at least one surface provided with a resin layer of an epoxy resin composition, or a carbon fiber base partly impregnated with an epoxy resin composition, with the remaining part carrying the composition attached at least on one surface thereof. It is preferable for the epoxy resin composition immediately after the impregnation or attachment to be flowable in order to ensure an improved workability in molding the prepreg into a predetermined shape.

Such prepreg can be produce by the wet method, hot melt method, etc., that are described below. The wet method includes the steps of immersing a reinforcement fiber base in a solution of an epoxy resin composition and a solvent, pulling it out, and evaporating the solvent using an oven etc., whereas the hot melt method includes the steps of heating an epoxy resin composition to reduce the viscosity and directly impregnating the reinforcement fiber with it, or the steps of coating release paper, film, or the like with the epoxy resin composition to prepare a thin sheet, attaching the thin epoxy resin composition sheet to either or both sides of a reinforcement fiber layer, and pressing them while heating so that the epoxy resin composition is transferred to impregnate the reinforcement fiber. The hot melt method is preferred because the resulting prepreg will be substantially free of residual solvent.

The quantity of carbon fiber per unit area of a prepreg sheet is preferably 70 to 1,000 g/m$^2$. If this quantity of carbon fiber is less than 70 g/m$^2$, a larger number of sheets have to be stacked to ensure a required thickness when molding carbon fiber reinforced composite material, possibly leading to troublesome operation. If this quantity of carbon fiber is more than 1,000 g/m$^2$, on the other hand, the prepreg tends to have poor drape properties. The content of carbon fiber in the prepreg is preferably 30 to 90 mass %, more preferably 35 to 85 mass %, and still more preferably 40 to 80 mass %. A carbon fiber content of 30 mass % or more is preferable because the high specific strength and specific modulus can be used effectively that represent good features of carbon fiber reinforced composite materials, whereas a content of 90 mass % or less is preferable because it enables easy production of uniform moldings.

When using a carbon fiber woven fabric as fiber base, the gaps present at the intersections of warp and weft yarns in the carbon fiber woven fabric is account for 5% or less at the time of prepreg production. The surface of the woven fabric prepreg is photographed by a stereoscopic microscope while applying light to the other side of the woven fabric prepreg. The weaving yarns are black and the gaps are white in the penetrating light pattern formed in the photograph. In an image-processed picture, the entire area S1 and the area of the white regions (gaps), S2, are measured and the proportion of the gaps are calculated as S2/S1.

Plies of the aforementioned prepreg are stacked and the resin is cured by heating while applying a pressure to the stack, thereby producing a composite material according to the present invention. Here, the application of heat and pressure can be carried out by using an appropriate method such as press molding, autoclave molding, bagging molding, wrapping tape molding, and internal pressure molding. In the wrapping tape molding method, a core bar such as mandrel is wound with a prepreg sheet to produce a tube of a composite material, and this method is suitable for manufacturing rod-like products including golf club shaft and fishing rod. More specifically, a mandrel is wound with a prepreg sheet and further wound with a wrapping tape of thermoplastic resin film to cover the prepreg sheet so that the prepreg sheet is secured and pressed, followed by heating and curing the resin in an oven and removing the core bar to provide a tubular material. In the internal pressure molding method, a preform formed of an internal pressure applying member such as a tube of thermoplastic resin wound with a prepreg sheet is fixed in a mold, and high pressure gas is introduced into the internal pressure applying member to apply a pressure while heating the mold to produce a molded article. This method is preferred for the molding of articles of complicated shapes such as golf club shaft, bat, and rackets for tennis or badminton.

Regarding the curing temperature and period for molding the composite material according to the present invention in an autoclave or oven, the optimum temperature and time conditions differ depending on the type and quantity of the curing agent and curing catalyst used, but curing is preferably performed for 0.5 to 8 hours at a temperature of 120° C. to 220° C. when producing a product with heat resistance at 130° C. or more. It has been preferred for the heating to be performed at a heating rate of 0.1° C. to 10° C./min. A heating rate of less than 0.1° C./min may result in a very long period of time required to reach an intended curing temperature, possibly leading to a low workability. A heating rate of more than 10° C./min, on the other hand, will cause an uneven temperature distribution over the reinforcement fiber due to the influence of air flows and internal heat generation, possibly making it impossible to provide a uniform cured product.

Pressurization or depressurization is not essential when molding the composite material according to the present invention, but pressurization or depressurization may be performed as required. In some cases, pressurization or depressurization has good effects including improvement in surface quality, control of internal void formation, and improvement in the contact with other metal, plastic, or composite material members to be bonded during the curing step.

The composite material according to the present invention can be used favorably in a wide variety of applications including aircraft structure members, windmill blades, automobiles' exterior plates, computer parts such as IC trays and notebook computer housing, and sporting goods such as golf club shaft and tennis racket.

EXAMPLES

The present invention is described in more detail below with reference to Examples. The methods used for measuring various physical properties are as described below. Measurement was performed in an environment with a temperature of 23° C. and relative humidity of 50% unless otherwise specified.

Component [A]

The commercial products given below were used as component [A].

Epicron (registered trademark) HP-820 (t-butyl catechol type epoxy, manufactured by DIC Corporation, epoxy equivalent 216). Note that according to Japanese Unexamined Patent Publication (Kokai) No. 2013-49781, Epicron HP-820 contains dimmers.

Denacol (registered trademark) Ex-201 (resorcinol type epoxy, manufactured by Nagase ChemteX Corporation, epoxy equivalent 117)

Denacol (registered trademark) Ex-203 (hydroquinone type epoxy, manufactured by Nagase ChemteX Corporation, epoxy equivalent 115)

YDC-1312 (2,5-t-butyl hydroquinone type epoxy, manufactured by Nippon Steel & Sumikin Chemical Co., Ltd., epoxy equivalent 177)

Substances synthesized as described below were also used.

t-butyl catechol type epoxy resin (hereinafter abbreviated as TBC)

First, 200 g of 4-t-butylcatechol, 560 g of epichlorohydrin, and 150 g of isopropyl alcohol were put in a 2 liter separable flask equipped with a thermometer, dropping funnel, cooling pipe, stirrer, baffle plate, and liquid-separating cock located in the lower part, dissolved by stirring, and heated to 40° C. Then, 530 g of a 20% aqueous sodium hydroxide solution was added dropwise over 3 hours from the dropping funnel. After the end of the dropping, stirring was continued for 30 minutes to complete the reaction. Subsequently, the stirring was stopped and the liquid was left to stand, followed by separating and removing the saline solution in the lower layer. Then, the excess epichlorohydrin, isopropyl alcohol, and water were recovered by distillation. The resulting crude resin was dissolved in 335 g of toluene, and 50 g of a 5% aqueous sodium hydroxide solution was added, followed by stirring at 80° C. for 3 hours. Subsequently, rinsing was performed, and the resulting salt and alkali component were removed by an oil separation technique, followed by dehydration, filtering, and toluene distillation to provide TBC. The resin had an epoxy equivalence of 216.

Component [B]

Araldite (registered trademark) MY721 (tetraglycidyl diaminodiphenyl methane, manufactured by Huntsman Advanced Materials Gmbh, epoxy equivalent 112)

TGDDS (tetraglycidyl diaminodiphenyl sulphone, manufactured by Konishi Chemical Ind. Co., Ltd., epoxy equivalent 112)

Araldite (registered trademark) MY0510 (triglycidyl-p-aminophenol, manufactured by Huntsman Advanced Materials Gmbh, epoxy equivalent 100)

Araldite (registered trademark) MY0600 (triglycidyl-m-aminophenol, manufactured by Huntsman Advanced Materials Gmbh, epoxy equivalent 105)

Component [C]

Sumikaexcel (registered trademark) PES5003P (hydroxyl-capped polyethersulfone, manufactured by Sumitomo Chemical Co., Ltd., Tg 225° C.)

Virantage (registered trademark) VW-10700 RP (hydroxyl-capped polyethersulfone, manufactured by Solvay Advanced Polymers, Tg 220° C.)

Sumikaexcel (registered trademark) PES7600P (chlorine-capped polyethersulfone, manufactured by Sumitomo Chemical Co., Ltd., Tg 225° C.)

Virantage (registered trademark) VW-30500 RP (polysulfone, manufactured by Solvay Advanced Polymers, Tg 205° C.)

ULTEM (registered trademark) 1010 (polyetherimide, manufactured by Sabic Innovative Plastics, Tg 215° C.)

Component [D]

3,3'-DAS (3,3'-diaminodiphenyl sulfone, manufactured by Mitsui Fine Chemical, Inc., active hydrogen equivalent 62, solid at room temperature)

Seikacure S (4,4'-diaminodiphenyl sulfone, manufactured by Wakayama Seika Kogyo Co., Ltd., active hydrogen equivalent 62, solid at room temperature)

Lonzacure (registered trademark) MIPA (4,4'-methylene bis(2-methyl-6-isopropyl) benzene amine, manufactured by Lonza, active hydrogen equivalent 78, solid at room temperature)

Component [E]

jER (registered trademark) 807 (bisphenol F type epoxy, manufactured by Mitsubishi Chemical Corporation, epoxy equivalent 170)

jER (registered trademark) 825 (bisphenol A type epoxy, manufactured by Mitsubishi Chemical Corporation, epoxy equivalent 175)

Thermoplastic Resin Particles

Grilamide (registered trademark) TR55 (manufactured by EMS-Chemie) was crushed and classified using an impact type crushing machine to provide fine particles with a number average particle diameter 20 μm.

(1) Preparation of Epoxy Resin Composition

In a kneader, an epoxy resin for component [A], epoxy resin for component [B], thermoplastic resin for component [C], and epoxy resin for component [E] were kneaded as they were heated up to 150° C., and kneading was continued at 150° C. to provide a transparent viscous liquid. A curing agent for component [D] was added, and kneading was continued to provide an epoxy resin composition. The components and their proportions used in Examples and Comparative examples are shown in Tables 1 to 6.

(2) Preparation of Woven Fabric Prepreg

The epoxy resin composition prepared in paragraph (1) above was spread over a piece of release paper to prepare a resin film with a predetermined resin areal weight. Sheets of this resin film were set in a prepreg production machine to sandwich a sheet of a reinforcement fiber woven fabric, and heated under pressure so that the fabric was impregnated with the thermosetting resin composition to provide a woven fabric prepreg with a fiber areal weight of 193 g/m$^2$ and a resin content of 38 mass %. Here, the reinforcement fiber woven fabric used was a plain weave woven fabric of Torayca (registered trademark) T400H-3K (3,000 fibers, tensile strength 4,410 MPa, tensile modulus 250 MPa, tensile elongation 1.8%).

(3) Bending Test of Cured Product

An uncured resin composition was defoamed in a vacuum and cured at a temperature of 180° C. for 2 hours in a mold having a 2 mm thick spacer of Teflon (registered trademark) set to produce a product with a thickness of 2 mm. The resulting cured product with a thickness of 2 mm was cut to a width of 10±0.1 mm and a length of 60±1 mm to prepare a test piece. Three point bending test with a span distance of 32 mm was conducted according to JIS-K7171 (1994) by using an Instron type universal tester (manufactured by Instron Corporation) to measure the elastic modulus. Six measurements were taken (N=6) and their average was calculated.

(4) Tg of Cured Product

The glass transition temperature Tg of the cured product prepared in paragraph (2) was determined as the midpoint temperature measured by differential scanning calorimetry (DSC) according to JIS K7121 (1987).

(5) Measurement of Viscosity of Resin Composition

The viscosity of epoxy resin compositions was measured by a dynamic viscoelasticity measuring machine (ARES-G2, manufactured by TA Instruments). A specimen of an epoxy resin composition was set between parallel flat plates with a diameter of 40 mm in such a manner that the distance between the upper and lower plates was 1 mm, and measurements were taken in the twist mode (angular frequency 3.14 rad/s) after confirming that an appropriate measuring temperature had been reached.

(6) Tensile Test of Fiber Reinforced Composite Material

Sheets of the woven fabric prepreg were stacked with their warp yarns aligned in the same direction and cured in an autoclave by heating for 2 hours at a temperature of 180° C. under a pressure of 6.10 kgf/cm$^2$ Pa to prepare a composite material. A test piece with a width of 25±0.5 mm, a length of 250±1.0 mm, and a tab-to-tab span of 130±1.0 mm was prepared from the resulting composite material and the warp tensile strength was measured according to EN2597B.

(7) Compression Test of Fiber Reinforced Composite Material

Nine sheets of the woven fabric prepreg were stacked with their warp yarns aligned in the same direction and molded under the same molding conditions as in paragraph (6) to prepare a composite material, from which a test piece with a width of 12.5±0.2 mm, a length of 75 to 80 mm, and a tab-to-tab span of 5.25±0.25 mm was prepared, followed by measuring the warp tensile strength according to EN2850B.

(8) Impact Resistance Test of Fiber Reinforced Composite Material

First, 24 sheets of the woven fabric prepreg were stacked in a pseudoisotropic manner with their directions aligned to $[45°/0°/-45°/90°]_{3s}$ (the symbol s representing mirror symmetry), where 0° is the warp direction, and molded under the same molding conditions as in paragraph (6) to prepare a composite material, from which a test piece with a width of 100±0.2 mm and a length of 150±0.2 mm was prepared. A falling weight impact was applied to the center with a weight of 5.4 kg falling from a height of 468 mm and then the test piece was compressed with a crosshead speed of 0.5 mm/min using a compression jig according to SACMA SRM 2R-94. Six measurements were taken (N=6) and their average was calculated.

TABLE 1

|  | Example 1 | Example 2 | Example 3 | Example 4 | Example 5 | Example 6 | Example 7 | Example 8 |
|---|---|---|---|---|---|---|---|---|
| Component [A] | | | | | | | | |
| HP-820 | 20 | 40 | | | | | | |
| Ex-201 | | | 20 | 40 | 20 | 20 | | |
| Ex-203 | | | | | | | 10 | 20 |
| YDC-1312 | | | | | | | | |
| Component [B] | | | | | | | | |
| MY721 | 80 | 60 | 80 | | | | | 80 |
| TGDDS | | | | | | | | |
| MY0510 | | | | 60 | 80 | 80 | | |
| MY0600 | | | | | | | 90 | |
| Component [C] | | | | | | | | |
| PES5003P | 10 | | 10 | | | 10 | | 10 |
| VW-10700RP | | | | | | | | |
| PES7600P | | | | 10 | | | | |
| VW-30500RP | | 10 | | | | | 10 | |
| ULTEM ®1010 | | | | | 10 | | | |
| Component [D] | | | | | | | | |
| 3,3'-DAS | 50 | 50 | | | 50 | | | |
| Seikacure S | | | 50 | 50 | | 60 | | 50 |
| Lonzacure ®MIPA | | | | | | | 50 | |
| Component [E] | | | | | | | | |
| jER ®807 | | | | | | | | |
| jER ®825 | | | | | | | | |

TABLE 1-continued

|  | Example 1 | Example 2 | Example 3 | Example 4 | Example 5 | Example 6 | Example 7 | Example 8 |
|---|---|---|---|---|---|---|---|---|
| Blending quantity of [C] relative to total (100 parts by mass) of [A] to [E] | 6 | 6 | 6 | 6 | 6 | 6 | 6 | 6 |
| Proportion of [D] relative to total (100 parts by mass) of [A] + [B] + [E] | 50 | 50 | 50 | 50 | 50 | 60 | 50 | 50 |
| Proportion of [E] relative to total (100 parts by mass) of [A] + [B] + [E] | 0 | 0 | 0 | 0 | 0 | 0 | 0 | 0 |
| Elastic modulus [GPa] of cured resin product | 4.6 | 4.7 | 4.2 | 4.3 | 4.8 | 4.3 | 4.5 | 4.2 |
| Tg [° C.] of cured resin product | 199 | 169 | 185 | 171 | 179 | 196 | 191 | 185 |
| Warp tensile strength [MPa] | 791 | 884 | 835 | 878 | 853 | 800 | 816 | 835 |
| Warp compression strength [MPa] | 904 | 912 | 870 | 878 | 921 | 878 | 895 | 870 |

Figures in the component [A] to [E] columns in the table are in parts by mass.

TABLE 2

|  | Example 9 | Example 10 | Example 11 | Example 12 | Example 13 | Example 14 | Example 15 | Example 16 |
|---|---|---|---|---|---|---|---|---|
| Component [A] |  |  |  |  |  |  |  |  |
| HP-820 |  |  |  | 20 |  |  |  |  |
| Ex-201 |  |  |  |  | 20 | 20 |  | 20 |
| Ex-203 | 20 |  | 20 |  |  |  |  |  |
| YDC-1312 |  | 20 |  |  |  |  | 20 |  |
| Component [B] |  |  |  |  |  |  |  |  |
| MY721 |  |  | 80 |  | 60 | 60 | 60 |  |
| TGDDS |  | 80 |  | 80 |  |  |  | 40 |
| MY0510 |  |  |  |  |  |  |  |  |
| MY0600 | 80 |  |  |  |  |  |  |  |
| Component [C] |  |  |  |  |  |  |  |  |
| PES5003P |  |  |  |  |  |  |  |  |
| VW-10700RP |  | 10 |  | 10 |  |  |  |  |
| PES7600P |  |  |  |  |  | 10 |  |  |
| VW-30500RP | 10 |  | 10 |  |  |  | 10 |  |
| ULTEM ®1010 |  |  |  | 10 |  |  |  | 10 |
| Component [D] |  |  |  |  |  |  |  |  |
| 3,3'-DAS |  | 35 |  |  | 50 | 50 |  |  |
| Seikacure S | 50 |  | 45 | 50 |  |  | 50 |  |
| Lonzacure ®MIPA |  |  |  |  |  |  |  | 50 |
| Component [E] |  |  |  |  |  |  |  |  |
| jER ®807 |  |  |  |  | 20 |  |  |  |
| jER ®825 |  |  |  |  |  | 20 | 20 | 40 |
| Blending quantity of [C] relative to total (100 parts by mass) of [A] to [E] | 6 | 7 | 6 | 6 | 6 | 6 | 6 | 6 |
| Proportion of [D] relative to total (100 parts by mass) of [A] + [B] + [E] | 50 | 35 | 45 | 50 | 50 | 50 | 50 | 50 |
| Proportion of [E] relative to total (100 parts by mass) of [A] + [B] + [E] | 0 | 0 | 0 | 0 | 20 | 20 | 20 | 40 |
| Elastic modulus [GPa] of cured resin product | 4.4 | 5.3 | 4.2 | 4.6 | 4.5 | 4.4 | 4.1 | 4.2 |
| Tg [° C.] of cured resin product | 166 | 160 | 185 | 203 | 178 | 186 | 195 | 168 |
| Warp tensile strength [MPa] | 894 | 912 | 835 | 779 | 856 | 831 | 803 | 887 |
| Warp compression strength [MPa] | 887 | 963 | 870 | 904 | 895 | 887 | 861 | 870 |

Figures in the component [A] to [E] columns in the table are in parts by mass.

TABLE 3

|  | Example 17 | Example 18 | Example 19 | Example 20 | Example 21 | Example 22 | Example 23 | Example 24 |
|---|---|---|---|---|---|---|---|---|
| Component [A] | | | | | | | | |
| HP-820 | 10 | 30 | | | | 10 | 50 | |
| Ex-201 | | | 20 | | | | | |
| Ex-203 | | | | 20 | | | | 50 |
| YDC-1312 | | | | | 20 | | | |
| Component [B] | | | | | | | | |
| MY721 | 90 | 70 | 80 | 80 | 80 | 90 | | |
| TGDDS | | | | | | | | |
| MY0510 | | | | | | | | |
| MY0600 | | | | | | | 40 | 40 |
| Component [C] | | | | | | | | |
| PES5003P | 10 | 10 | 10 | 10 | 10 | 10 | | |
| VW-10700RP | | | | | | | 10 | 10 |
| PES7600P | | | | | | | | |
| VW-30500RP | | | | | | | | |
| ULTEM ®1010 | | | | | | | | |
| Component [D] | | | | | | | | |
| 3,3'-DAS | 50 | 50 | 50 | 50 | 50 | | | |
| Seikacure S | | | | | | 50 | | |
| Lonzacure ®MIPA | | | | | | | 50 | 50 |
| Component [E] | | | | | | | | |
| jER ®807 | | | | | | | 10 | 10 |
| jER ®825 | | | | | | | | |
| Blending quantity of [C] relative to total (100 parts by mass) of [A] to [E] | 6 | 6 | 6 | 6 | 6 | 6 | 6 | 6 |
| Proportion of [D] relative to total (100 parts by mass) of [A] + [B] + [E] | 50 | 50 | 50 | 50 | 50 | 50 | 50 | 50 |
| Proportion of [E] relative to total (100 parts by mass) of [A] + [B] + [E] | 0 | 0 | 0 | 0 | 0 | 0 | 10 | 10 |
| Elastic modulus [GPa] of cured resin product | 4.4 | 4.6 | 4.4 | 4.2 | 4.3 | 4.1 | 4.3 | 4.2 |
| Tg [° C.] of cured resin product | 212 | 184 | 189 | 194 | 191 | 220 | 164 | 159 |
| Warp tensile strength [MPa] | 751 | 838 | 822 | 807 | 816 | 750 | 900 | 915 |
| Warp compression strength [MPa] | 887 | 904 | 887 | 870 | 878 | 861 | 874 | 870 |

Figures in the component [A] to [E] columns in the table are in parts by mass.

TABLE 4

|  | Comparative example 1 | Comparative example 2 | Comparative example 3 | Comparative example 4 | Comparative example 5 | Comparative example 6 | Comparative example 7 |
|---|---|---|---|---|---|---|---|
| Component [A] | | | | | | | |
| HP-820 | | | | | | 100 | 37 |
| Ex-201 | | | | | | | |
| Ex-203 | | 50 | | | | | |
| YDC-1312 | | | | | 100 | | 100 |
| Component [B] | | | | | | | |
| MY721 | 100 | | | | | | |
| TGDDS | | | 100 | | | | |
| MY0510 | | | | | | | |
| MY0600 | | | | | | | |
| Component [C] | | | | | | | |
| PES5003P | | | | | | | |
| VW-10700RP | 10 | | | | | | |
| PES7600P | | | | | | | |
| VW-30500RP | | 10 | | | | | |
| ULTEM ®1010 | | | | | | | |

TABLE 4-continued

|  | Comparative example 1 | Comparative example 2 | Comparative example 3 | Comparative example 4 | Comparative example 5 | Comparative example 6 | Comparative example 7 |
|---|---|---|---|---|---|---|---|
| Component [D] | | | | | | | |
| 3,3'-DAS | 50 | | 50 | | 50 | | |
| Seikacure S | | | | 50 | | 50 | |
| Lonzacure ®MIPA | | 50 | | | | | 50 |
| Component [E] | | | | | | | |
| jER ®807 | | 50 | | | | | |
| jER ®825 | | | | | | | 63 |
| Blending quantity of [C] relative to total (100 parts by mass) of [A] to [E] | 6 | 6 | 0 | 0 | 0 | 0 | 0 |
| Proportion of [D] relative to total (100 parts by mass) of [A] + [B] + [E] | 50 | 50 | 50 | 50 | 50 | 50 | 50 |
| Proportion of [E] relative to total (100 parts by mass) of [A] + [B] + [E] | 0 | 50 | 0 | 0 | 0 | 0 | 63 |
| Elastic modulus [GPa] of cured resin product | 4.5 | 4.0 | 5.3 | 4.4 | 5.0 | 2.9 | 4.0 |
| Tg [° C.] of cured resin product | 228 | 141 | 212 | 96 | 80 | 122 | 152 |
| Warp tensile strength [MPa] | 701 | 971 | 676 | 1000 | 1161 | 1031 | 937 |
| Warp compression strength [MPa] | 895 | 853 | 963 | 886 | 938 | 759 | 853 |

Figures in the component [A] to [E] columns in the table are in parts by mass.

TABLE 5

|  | Example 25 | Example 26 | Example 27 | Example 28 | Example 29 |
|---|---|---|---|---|---|
| Component [A] | | | | | |
| TBC | 10 | 20 | 40 | 10 | |
| HP-820 | | | | 10 | 10 |
| Ex-201 | | | | | 10 |
| Component [B] | | | | | |
| MY721 | 90 | 80 | 60 | 80 | 80 |
| TGDDS | | | | | |
| MY0510 | | | | | |
| MY0600 | | | | | |
| Component [C] | | | | | |
| PES5003P | 10 | 10 | | 10 | 10 |
| VW-10700RP | | | | | |
| PES7600P | | | | | |
| VW-30500RP | | | 10 | | |
| ULTEM ® 1010 | | | | | |
| Component [D] | | | | | |
| 3,3'-DAS | 50 | 50 | 50 | 50 | 50 |
| Seikacure S | | | | | |
| Lonzacure ® MIPA | | | | | |
| Component [E] | | | | | |
| jER ® 807 | | | | | |
| jER ® 825 | | | | | |
| Blending quantity of [C] relative to total (100 parts by mass) of [A] to [E] | 6 | 6 | 6 | 6 | 6 |
| Proportion of [D] relative to total (100 parts by mass) of [A] + [B] + [E] | 50 | 50 | 50 | 50 | 50 |
| Proportion of [E] relative to total (100 parts by mass) of [A] + [B] + [E] | 0 | 0 | 0 | 0 | 0 |
| Elastic modulus [GPa] of cured resin product | 4.3 | 4.5 | 4.6 | 4.4 | 4.3 |
| Tg [° C.] of cured resin product | 220 | 210 | 185 | 216 | 196 |
| Warp tensile strength [MPa] | 750 | 757 | 835 | 750 | 800 |
| Warp compression strength [MPa] | 878 | 895 | 904 | 887 | 878 |

Figures in the component [A] to [E] columns in the table are in parts by mass.

TABLE 6

|  | Example 17 | Example 30 |
|---|---|---|
| Component [A] | | |
| HP-820 | 10 | 10 |
| Component [B] | | |
| MY721 | 90 | 90 |
| TGDDS | | |
| MY0510 | | |
| MY0600 | | |
| Component [C] | | |
| PES5003P | 10 | 10 |
| VW-10700RP | | |
| PES7600P | | |
| VW-30500RP | | |
| ULTEM ® 1010 | | |
| Component [D] | | |
| 3,3'-DAS | 50 | 50 |
| Seikacure S | | |
| Lonzacure ® MIPA | | |
| Component [E] | | |
| jER ® 807 | | |
| jER ® 825 | | |
| Blending quantity of [C] relative to total (100 parts by mass) of [A] to [E] | 6 | 6 |

TABLE 6-continued

|  | Example 17 | Example 30 |
|---|---|---|
| Proportion of [D] relative to total (100 parts by mass) of [A] + [B] + [E] | 50 | 50 |
| Proportion of [E] relative to total (100 parts by mass) of [A] + [B] + [E] | 0 | 0 |
| Thermoplasticity particles Grilamide ® TR55 fine particles | 0 | 10 |
| Elastic modulus [GPa] of cured resin product | 4.4 | 4.1 |
| Tg [° C.] of cured resin product | 212 | 200 |
| Warp tensile strength [MPa] | 751 | 788 |
| Warp compression strength [MPa] | 887 | 861 |
| impact resistance [Mpa] | 230 | 250 |

Figures in the component [A] to [E] columns in the table are in parts by mass.

For the present invention, a cured product was rated as acceptable if it had an elastic modulus of 4.1 GPa or more, a Tg of 150° C. or more, a warp tensile strength of 750 MPa or more, and a warp compression strength of 860 MPa or more.

In all Examples and Comparative examples except Comparative example 8, the viscosity adjustment range at 80° C. was between 0.01 and 200 Pa-s, and it was confirmed that the epoxy resin composition can work effectively in impregnation during the prepreg preparation and that the resulting prepreg had a high tackiness for bonding between prepreg sheets and bonding between a prepreg sheet and a metal plate.

Examples 1 to 12, 17, 18, and 25 to 29

In Examples 1 to 12, 17, 18, and 25 to 29, appropriate constituents for components [A], [B], [C], and [D] were selected from the available materials as specified in Tables 1 to 3 and 5 and each constituent was added in the specified range to prepare an epoxy resin composition. Tests were performed for the cured products and fiber reinforced composite materials obtained and results showed that they all had good physical properties including elastic modulus, Tg, warp tensile strength, and warp compression strength.

Examples 13 to 16, 23, and 24

Except for further adding component [E] in addition to component [A], [B], [C], and [D], the same procedures as in Examples 1 to 12 were carried out to produce epoxy resin compositions from the constituents specified in Tables 2 and 3. Tests were performed for the cured products and fiber reinforced composite materials obtained and results showed that the test pieces had good physical properties when the content of component [E] was 40 mass % or less.

Examples 1, and 19 to 21

While fixing the proportions of components [A], [B], [C], and [D], HP-820 (catechol type), EX-201 (resorcinol type), Ex-203 (hydroquinone type), or YDC-1312 (hydroquinone type) was used as component [A] to prepare a cured product and fiber reinforced composite material, and test results showed that each of them had an intended elastic modulus, Tg, warp tensile strength, and warp compression strength. In particular, the catechol type test piece having the ortho-positional structure was found to have the highest warp tensile strength and warp compression strength, followed by the resorcinol type one having the meta-positional structure and then the hydroquinone type one having the para-positional structure.

Examples 17 and 22

Except for using Seikacure S as component [D], the same blending plan as in Example 17 was adopted to prepare a cured product and fiber reinforced composite material, and test results showed that each of them had an intended elastic modulus, Tg, warp tensile strength, and warp compression strength. A higher resin elastic modulus and warp compression strength were realized in Examples 17 in which 3,3'-diaminodiphenyl sulfone was used than in Example 22 in which 4,4'-diaminodiphenyl sulfone was used.

Comparative Examples 1 to 7

As seen from Table 4, the cured product had a lower elastic modulus and warp compression strength in Comparative example 1 in which component [A] was not used. The cured product had a lower elastic modulus, Tg, and warp compression strength in Comparative example 2 in which component [B] was not used. The cured product had a lower warp tensile strength in Comparative example 3 in which components [A] and [C] were not used. The cured products had lower Tg's in Comparative examples 4 to 6 in which components [B] and [C] were not used, and the cured product prepared in Comparative example 6 also had a lower elastic modulus and warp compression strength.

Examples 17 and 30

Except for adding thermoplastic resin particles when preparing an epoxy resin composition, the same procedure was carried out as in Example 17 to provide a woven fabric prepreg, from which a interlaminar resin layer for fiber reinforced composite material was prepared and subjected to comparison with Example 17 in terms of the impact resistance of the fiber reinforced composite material produced. It was confirmed that the impact resistance was higher in Example 30, in which thermoplastic resin particles were added, than in Example 17.

INDUSTRIAL APPLICABILITY

The epoxy resin composition according to the present invention can serve to produce a carbon fiber reinforced composite material that is higher in tensile strength and compression strength than any conventional ones, and the carbon fiber reinforced composite material produced from the epoxy resin composition is useful as it can be used favorably as structural members of aircraft and automobiles to which conventional materials cannot be applied successfully.

The invention claimed is:

1. An epoxy resin composition comprising at least the undermentioned components [A] to [D], component [A] accounting for 5 to 50 mass % and component [B] accounting for 20 to 95 mass % relative to the total quantity, which accounts for 100 mass %, of the epoxy resins:

[A]: at least one catechol type epoxy resin selected from the group consisting of 1,2-bis(glycidyloxy) benzene, 1,2-bis(glycidyloxy) benzene substituted by t-butyl, and epoxy resins each having a structure as represented by formula [1]:

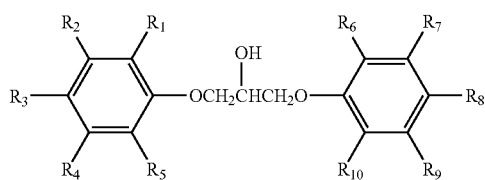

wherein $R_1$ and $R_6$ in formula [1] are each a glycidyl ether group and the rest of $R_2$ to $R_5$ and $R_7$ to $R_{10}$ are each a hydrogen atom, a halogen atom, or an aliphatic hydrocarbon group having 4 or less carbon atoms;

[B]: a glycidyl amine epoxy resin having three or more glycidyl groups per molecule;

[C]: a thermoplastic resin soluble in epoxy resins; and

[D]: an epoxy resin curing agent.

2. An epoxy resin composition as set forth in claim 1, wherein component [C] has a Tg of 200° C. or more.

3. An epoxy resin composition as set forth in claim 1, wherein component [C] is at least one selected from the group consisting of polyether sulfone, polyether ether sulfone, polyether imide, polyphenylene oxide, and polysulfone.

4. An epoxy resin composition as set forth in claim 1, wherein component [C] accounts for 1 to 20 mass % relative to the total quantity, which accounts for 100 mass %, of the epoxy resins.

5. An epoxy resin composition as set forth in claim 1, wherein component [D] is solid at room temperature.

6. An epoxy resin composition as set forth in claim 1, wherein component [D] is an aromatic amine.

7. An epoxy resin composition as set forth in claim 1, wherein component [D] is an aromatic polyamine having one to four phenyl groups in the molecule, at least one of the phenyl groups containing amino groups at ortho or meta positions.

8. An epoxy resin composition as set forth in claim 1, further comprising a bifunctional epoxy resin as component [E].

9. An epoxy resin composition as set forth in claim 8, wherein component [E] is either a bisphenol A type epoxy resin or a bisphenol F type epoxy resin.

10. An epoxy resin composition as set forth in claim 8, wherein component [E] accounts for 40 mass % or less relative to the total quantity, which accounts for 100 mass %, of the epoxy resins.

* * * * *